United States Patent
Xiao et al.

(10) Patent No.: US 8,134,933 B2
(45) Date of Patent: Mar. 13, 2012

(54) QUALITY CHANNEL REPORTING IN A TIME DIVISION SYSTEM

(75) Inventors: Lei Xiao, Beijing (CN); Jie Mao, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 219 days.

(21) Appl. No.: 12/676,059

(22) PCT Filed: Sep. 4, 2007

(86) PCT No.: PCT/SE2007/050616
§ 371 (c)(1),
(2), (4) Date: Mar. 2, 2010

(87) PCT Pub. No.: WO2009/031954
PCT Pub. Date: Mar. 12, 2009

(65) Prior Publication Data
US 2010/0195523 A1     Aug. 5, 2010

(51) Int. Cl.
*H04J 1/16* (2006.01)
*H04J 3/00* (2006.01)
*H04B 7/212* (2006.01)

(52) U.S. Cl. .................. 370/252; 370/345; 370/442

(58) Field of Classification Search .................. None
See application file for complete search history.

(56) References Cited

U.S. PATENT DOCUMENTS 7,486,956 B2 * 2/2009 Casaccia et al. ........... 455/452.2
2005/0201499 A1 * 9/2005 Jonsson ........................ 375/348

FOREIGN PATENT DOCUMENTS

WO     2005/109705 A1     11/2005

OTHER PUBLICATIONS

Korhonen, J. Introduction to 3G Mobile Communications (Second Edition). Artech House, Incorporated: Norwood, MA, USA, pp. 14-20. 2003.
3rd Generation Partnership Project. "Quality Feedback Procedure for TDD HSDPA." 3GPP TSG-RAN WG1#23, Tdoc R1-02-0010, Espoo, Finland, Jan. 8-11, 2002.

* cited by examiner

*Primary Examiner* — Nittaya Juntima
(74) *Attorney, Agent, or Firm* — Coats & Bennett, P.L.L.C.

(57) ABSTRACT

A method (400) for use in a wireless communications system (100) with a first transceiver (110) and a second transceiver (130) which communicate with each other, which system is a TDD-system, with communication divided into time frames with time slots. According to the method, the first transceiver transmits (410) a dedicated signal for use as a communications quality indicator by the second transceiver, and the second transceiver reports (420) measurements of the dedicated signal to the first transceiver. The dedicated signal is by the first transceiver in one or more TDD time slots, and the second transceiver measures (430) the individual signal strength of the dedicated signal in at least a first and a second time slot and transmits (440) measurement reports to the first transceiver based on the individual measurements in the first and second time slots of the dedicated signal.

15 Claims, 5 Drawing Sheets

Fig 1

Prior Art

QUALITY CHANNEL REPORTING IN A TIME DIVISION SYSTEM

TECHNICAL FIELD

The present invention discloses a method for use in a wireless communications system in which there is at least a first transceiver and a second transceiver which may communicate with each other according to the TDD principle, i.e. Time Division Duplex.

BACKGROUND

In the cellular wireless communications system known as the TD-SCDMA system (Time Division Synchronous Code Division Multiple Access), there can be communication between a base station such as a NodeB and user terminals within a certain area which is controlled by the base station, said area usually being referred to as a cell.

In one embodiment of the TD SCDMA system, the amount of data which is sent from the NodeB to the user terminal, the UE, is related to the quality of the link between the NodeB and the UE, i.e. the "down link".

The quality of the down link is obtained by means of letting the NodeB use a dedicated channel for certain transmissions, and the received signal strength at the UE of these transmissions is then reported back to the NodeB.

In the TD SCDMA system, the dedicated channel which is used for quality measurements is known as the HS PDSCH channel (High Speed Physical Downlink Shared Channel), which is a shared channel in the system on which traffic data is sent.

Based on the received signal strength of the HS PDSCH at a UE, the UE will report a CQI (Channel Quality Information) to the NodeB. The CQI will comprise the RTBS, Recommended Transport Block Size, and the RMF, Recommended Modulation Format.

A TDD system is by definition a system which utilizes a number of time frames, each time frame being divided into time slots, and in the TD SCDMA system, the HS PDSCH channel can be used in more than one time slot per frame.

The UE in the TD SCDMA system reports the CQI per HS PDSCH, although the HS PDSCH can be used in more than one time slot per frame. This means that the down link channel quality in a number of time slots may be "lumped together" in one report, although the downlink channel conditions can vary between time slots. This may result in less than optimal choices of, for example, the parameters Transport Block Size and Modulation Format in some down link time slots to an UE.

SUMMARY

Thus, as has emerged from the description above, there is thus a need for a solution by means of which a more efficient measuring and reporting of channel quality from a UE to the UE's NodeB can be obtained in a TDD system, in particular in a TD-SCDMA system.

Such a solution is offered by the present invention, in that it discloses a method for use in a wireless communications system in which there is at least a first transceiver and a second transceiver which may communicate with each other.

In the system of the invention, use is made of the TDD, Time Division Duplex, principle for communication between the first and second transceivers, so that the communication between them is divided into time frames, each time frame comprising a number of time slots, and according to the invention, the first transceiver transmits a signal or channel which may be used as a communications quality indicator by the second transceiver, and the second transceiver reports measurements of said signal or channel to the first transceiver.

Said signal or channel which is transmitted by the first transceiver in one or more TDD time slots, and according to the invention, the second transceiver measures the individual signal strength of the signal or channel in at least a first and a second time slot of one and the same TDD frame, and transmits measurement reports to the first transceiver based on the individual measurements in said first and second time slots.

Thus, two transceivers such as a UE and a NodeB in a TD SCDMA system may utilize the invention by means of letting the UE make down link signal quality measurements per time slot and report said measurements per time slot. The reports may also in a certain embodiment comprise RTBS and/or RMF on a time slot level.

Accordingly, the down link channel quality reports from an UE to its NodeB will be more accurate by means of the invention.

In a particular embodiment of the invention, the second transceiver measures the signal strength of the signal or channel in each time slot where the signal or channel is used by the first transceiver.

Also, the second transceiver can transmit measurement reports to the first transceiver based on the measurement in each of the individual time slot where the signal or channel is used by the first transceiver.

In order to facilitate for the second transceiver, the first transceiver can inform the second transceiver about which time slots that are going to be used for said signal or channel.

BRIEF DESCRIPTION OF THE DRAWINGS

The invention will be described in more detail in the following, with reference to the appended drawings, in which.

DETAILED DESCRIPTION

Figure 1:
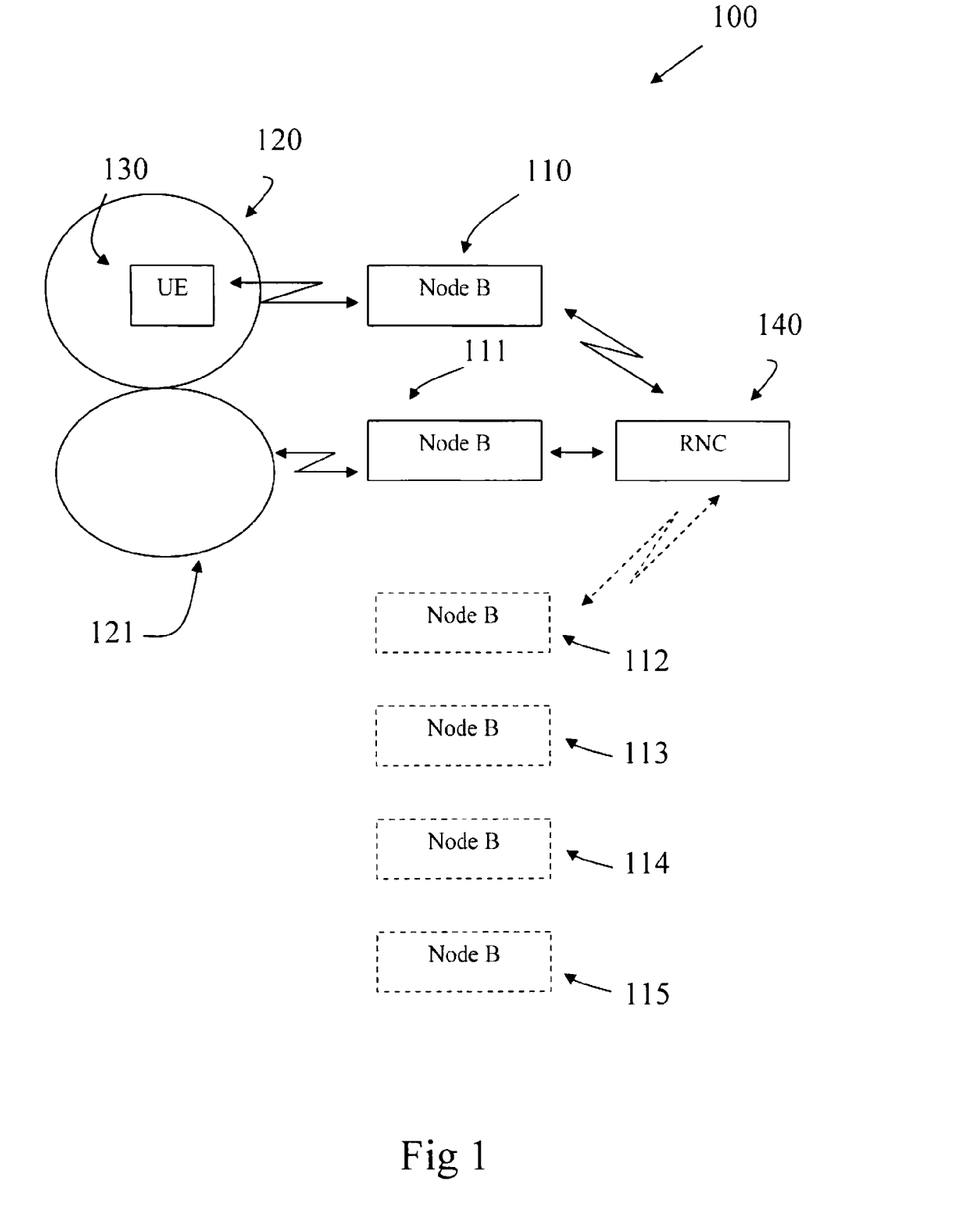
FIG. 1 shows a schematic view of a system in which the invention may be used.

FIG. 1 shows a schematic view of a system 100 in which the present invention may be applied. Thus, the system in FIG. 1 is a TDD system, and in this example it will be described as a TD-SCDMA system (Time Division Synchronous Code Multiple Access), although it should be realized that the invention may be used in a variety of TDD systems in which the signal quality of a certain down link channel is used for purposes of setting up the down link "payload" traffic. The term "setting up" should here be seen as comprising for example, the scheduling of the channel, and possibly also the modulation format.

As shown in FIG. 1, the system 100 comprises a number of base stations 110, also referred to as "NodeB". One purpose of a NodeB is to control the traffic to and from user terminals, UEs, in a certain area, a so called cell, in the system.

FIG. 1 shows a number of NodeBs 110-115, two of which, 110, 111, are shown with their respective cells, 120 and 121. The possible presence of a number of UEs in each cell is symbolically indicated by means of one UE 130 in cell 120.

Also shown in FIG. 1 is the "next level" in the system as seen from the NodeBs, i.e. a so called Radio Network Controller, an RNC 140.

The NodeB transmits, inter alia, a shared downlink channel referred to as HS-PDSCH, High Speed Physical Downlink Channel. The UEs in the cell of the NodeB measure the received signal strength of the HS-PDSCH, and reports a CQI, Channel Quality Information, to the NodeB.

The CQI reported to the NodeB comprises parameters known as RTBS, Recommended Transport Block Size, and RMF, Recommended Modulation Format. As may be gleaned from the names of these parameters, the NodeB will use the parameters in order to set up the down link traffic to the UE with respect to the Transport Block Size, TBS, and Modulation Format, MF, in the down link traffic channels.

As may be understood from the name, a TDD system such as TD SCDMA uses a number of different time frames, each of which in turn comprises a number of time slots, and the down link conditions may vary between the time slots, which implies that the parameters TBS and MF should also be varied between the time slots, or at least that the system should have the possibility of varying those parameters between the time slots used by the system.

In present TD-SCDMA systems however, the UEs only send CQI per HS-PDSCH, although the HS-PDSCH may be transmitted over more than one time slot. This means that the NodeB will not get information on the down link conditions in each of the individual time slots used by the NodeB for the HS-PDSCH.

Before describing this principle further, it can be mentioned that the TD-SCDMA system at present uses six time slots per carrier in which the HS-PDSCH can be used, and that there can be up to sixteen channelization codes in each time slot.

Figure 2:
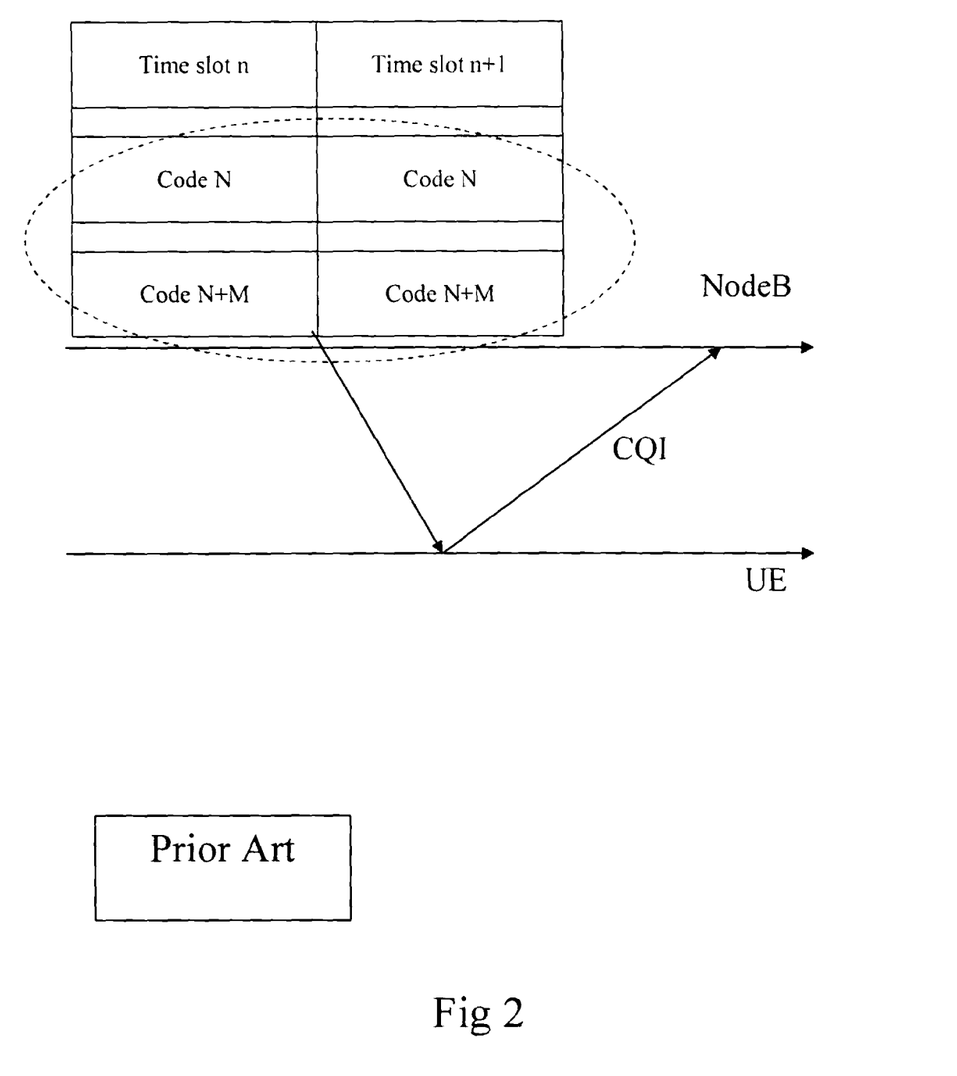
FIG. 2 shows a prior art design.

With reference to FIG. 2, the principle used in present day TD SCDMA systems can be seen in a graphic manner: in each TDD time slot, there can be a number of channel codes, up to sixteen channel codes in each time slot. In FIG. 2, two time slots, referred to as n and n+1 are shown, each of which contains Code N and Code N+M.

As also shown in FIG. 2, the UE reports a "collective" CQI for time slots n and n+1. Thus, although the down link signal quality may vary between slots n and n+1, the CQI reported by the UE will not be able to reflect this, and as a consequence, the NodeB will not be able to set up the down link traffic optimally per time slot.

The present invention aims to remedy this drawback of contemporary systems by means of enabling the UE to measure and report CQI for each time slot in which the HS-PDSCH is used. This principle is illustrated graphically in FIG. 3: in similarity with FIG. 2, there is in FIG. 3 shown two time slots n and n+1, each of which comprises channel codes N and N+M.

Figure 3:
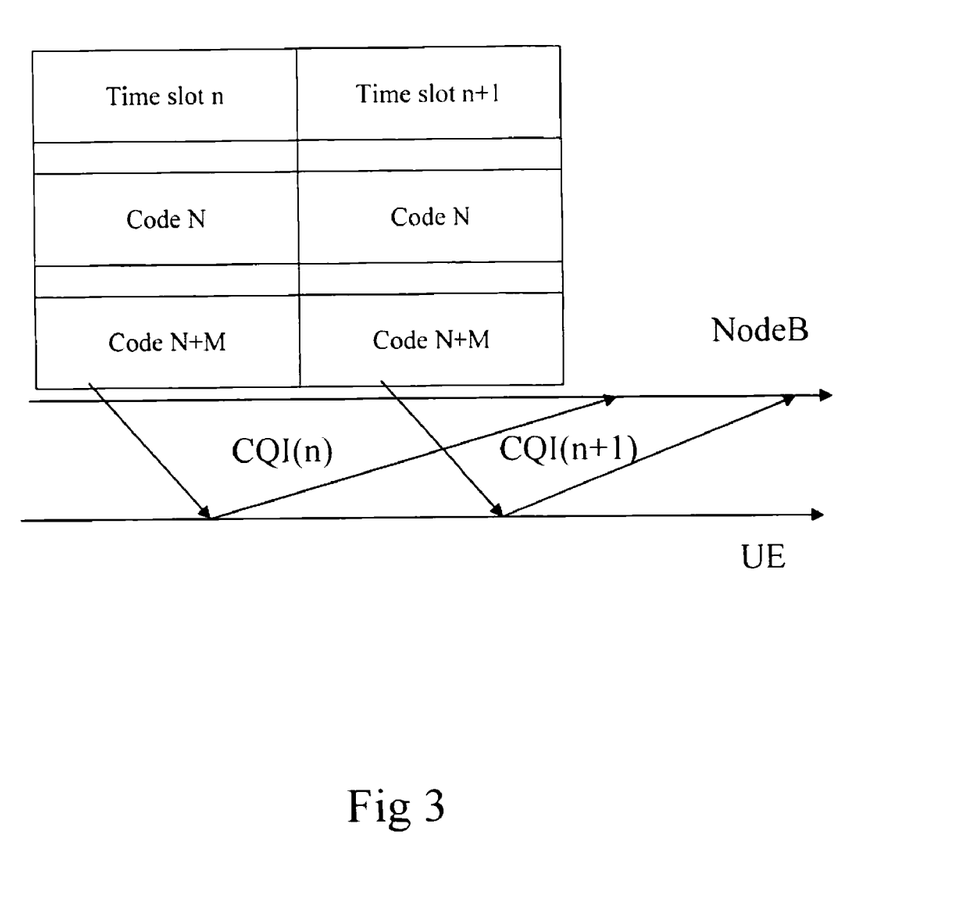
FIG. 3 shows one embodiment of the invention.

As illustrated in FIG. 3, the UE measures the signal strength of the HS-PDSCH in both time slot n and time slot n+1, and reports one CQI for each of those time slots to the NodeB. Thus, by means of the invention, the downlink quality per time slot will be reported to the NodeB, which will enable the NodeB to set up the down link traffic per time slot, with respect to such parameters, as for example, the Transport Block Size and Modulation Format. It should be pointed out that although two time slots n and n+1 are shown in FIG. 3, this is by way of example only, the amount of time slots which the UE can measure and report the CQI for can be varied freely within the scope of the present invention.

It should be pointed out that although the invention comprises the possibility for the UEs to measure CQI in each time slot in which the HS-PDSCH is transmitted by the NodeB, this is not a necessity according to the invention, it is merely a possibility which is used in a preferred embodiment of the invention. However, the UE should measure the individual signal strength of the HS-PDSCH or some other such dedicated signal in at least a first and a second time slot and transmit measurement reports, CQIs, to the NodeB based on the individual measurements in said first and second time slots of the HS-PDSCH.

However, in a certain embodiment of the invention, the UE measures the signal strength of the HS-PDSCH in each time slot where it is used by the NodeB, and in one particular embodiment, the UE also transmits measurement reports, CQIs, to the NodeB based on the measurement in each individual time slot where the HS-PDSCH is used by the NodeB.

In order to facilitate for the UEs when it comes to measuring the strength of the received signal of the HS-PDSCH, the NodeB may let the UEs know in advance in which coming time slots, i.e. in which next nth time slot or which nth slot in the next frame that the NodeB will schedule the HS-PDSCH in. Naturally, other solutions to this can also be seen, such as, for example, letting the UEs detect that channel on their own.

Figure 4:
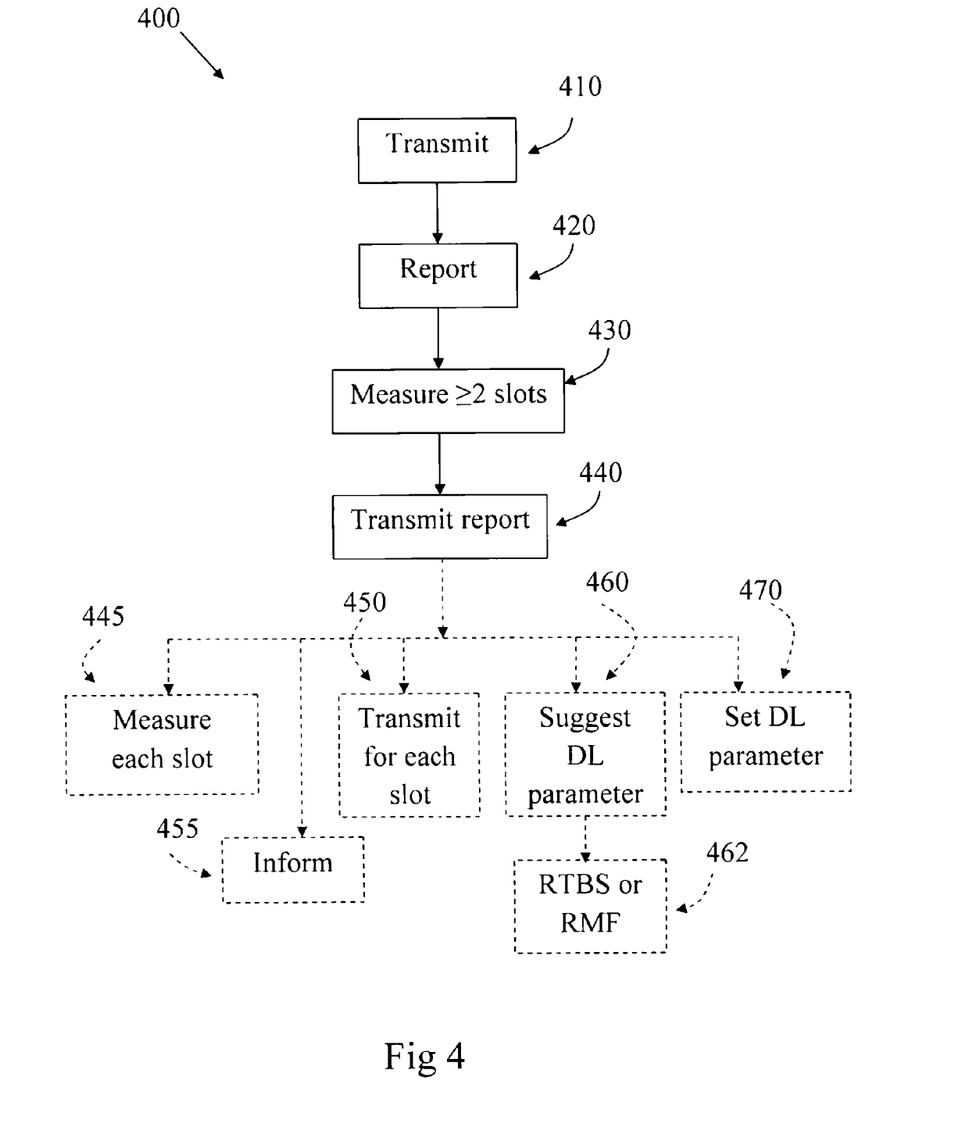
FIG. 4 shows a block diagram of some steps of a method of the invention.

FIG. 4 shows a schematic flow chart 400 of a method according to the invention. Steps which are options or alternatives are indicated with dashed lines.

Thus, as has also been explained previously in this text, the method 400 of the invention is intended for use in a wireless communications system such as the system 100 shown in FIG. 1, in which there is at least a first transceiver 110 such as a NodeB and a second transceiver such as a UE 130, which may communicate with each other.

According to the method 400, as indicated in step 410, the first transceiver transmits a signal which may be used as a communications quality indicator by the second transceiver, and the second transceiver reports, as shown in step 420, measurements of that signal to the first transceiver. This signal can be the HS-PDSCH as mentioned previously, or it can be some other downlink channel or signal which is transmitted by the NodeB, such as, for example, the down link user traffic data transmitted by the NodeB.

The signal to be measured is transmitted by the first transceiver in one or more TDD time slot, and as shown in step 430, the second transceiver measures 430 the individual signal strength of the signal in at least a first and a second time slot and transmits, step 440, measurement reports to the first transceiver based on the individual measurements in the first and second time slots of the signal.

As indicated in step 445, the second transceiver may measure the signal strength of the signal in each time slot where the signal is used by the first transceiver. Also, as shown in step 450, the second transceiver can, in one embodiment of the invention, transmit measurement reports to the first transceiver based on the measurement in each individual time slot where the signal which is to be measured is used by the first transceiver.

Step 455 indicates that the first transceiver can be used to inform the second transceiver about which time slots that are going to be used for the measured signal or channel.

As shown in step 460, the second transceiver may include at least one suggested down link parameter in the signal report to the first transceiver. Step 462 shows that one of those parameters can be the RTBS (Recommended Transport Block Size) or the RMF (Recommended Modulation Format).

Step 470 indicates that the first transceiver can set, for a certain second transceiver, at least one down link channel parameter such as the Transport Block Size or Modulation Format for one or more time slots according to the report from the UE.

Figure 5:
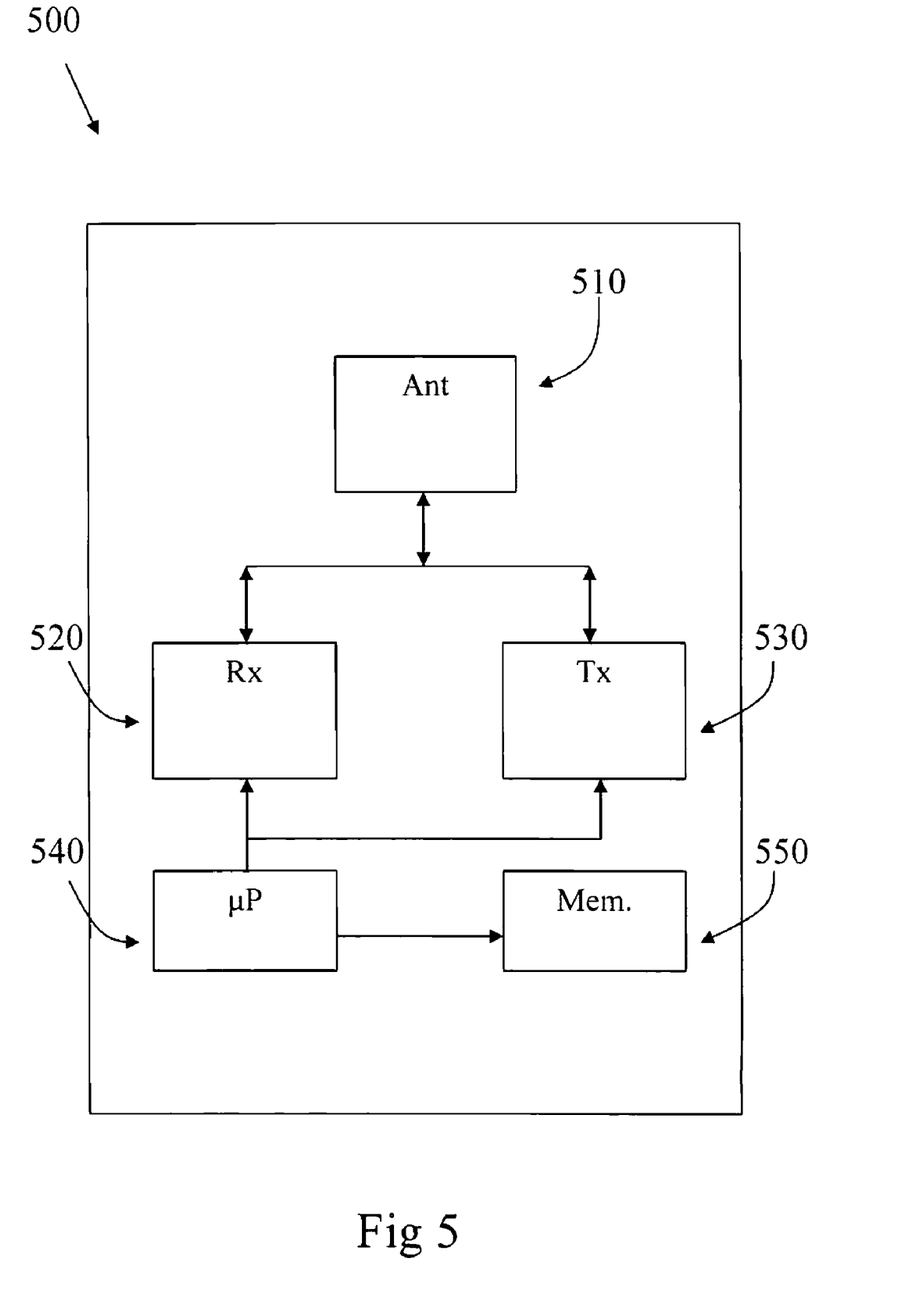
FIG. 5 shows a schematic block diagram of a terminal according to the invention.

FIG. 5 shows a schematic block diagram of a user terminal, a UE 500 of the invention. As can be seen in FIG. 5, the user terminal 500 comprises an antenna 510 for communicating with the controlling node, the NodeB, and also comprises a transmitter 530 and a receiver 520. In addition, the user terminal 500 also comprises a control means such as for example a microprocessor 540, as well as comprising a memory 550.

As has emerged from the description above, the user terminal 500 of the invention is intended for use in a cellular wireless communications system such as the one 100 of FIG. 1, i.e. a system which operates according to the TDD principle, so that communication is divided into time frames which may each comprise a number of time slots.

As indicated in FIG. 5, the user terminal 500 is equipped with means 510, 520, 530 for communicating with a base station 110 in the system, said communicating means suitably being the antenna 510, the transmitter 530 and the receiver 520 of the UE 500. The UE 500 is also equipped with means for detecting a dedicated and measuring the signal strength of a certain predefined signal or channel transmitted by the base station in one or more TDD time slots of the system, these detecting and measuring means suitably being the control means 540, possibly in conjunction with the memory 550.

Additionally, the user terminal 500 is equipped with means such as the controller 540, the transmitter 530 and the antenna 510 for reporting the measured signal strength to the base station.

Also, the user terminal 500 is such that its detecting means, i.e. the parts 510, 520, 540 and measuring means, i.e. components 540 and 550 enable the user terminal to detect and measure the signal strength of the signal or channel in more than one time slot of one and the same TDD frame, and its reporting means 510, 530, 550 enable the UE to report measurements of the signal strength in individual time slots to the base station.

Suitably, the measuring means 540, 550 enable the terminal to measure the signal strength of said signal or channel in each time slot where it is used by the base station, and in a preferred embodiment, the reporting means 510, 530, 540 enable the UE to transmit measurement reports to the base station based on the measurement in each individual time slot where said signal or channel is used by the base station.

The user terminal 500 may also be equipped with means such as the antenna 510 and the transmitter 530 for being informed by the base station regarding which time slots that are going to be used by the base station for said signal or channel.

As has been mentioned previously, the signal or channel which the terminal can measure and report is suitably the HS-PDSCH channel in the TD-SCDMA system.

The invention is not limited to the examples of embodiments described above and shown in the drawings, but may be freely varied within the scope of the appended claims. For example, the signal or channel transmitted by the base station/first transceiver and which is measured and reported by the UE/second transceiver can be one of a variety of the down link signals or channels used in the system.

The invention claimed is:

1. A method for use in a wireless communications system in which there is at least a first transceiver and a second transceiver that communicate using Time Division Duplex (TDD), wherein said TDD communication is divided into time frames each of which in turn can comprise a number of time slots, and wherein the first transceiver transmits a dedicated signal or channel for use as a communications quality indicator by the second transceiver, and the second transceiver reports measurements of the dedicated signal or channel to the first transceiver, the dedicated signal or channel being transmitted by the first transceiver in more than one TDD time slots, and said method comprising:

measuring at the second transceiver the individual signal strength of the dedicated signal or channel in at least a first and a second time slots of one and the same TDD frame and transmitting measurement reports from the second transceiver to the first transceiver based on the individual measurements in said first and second time slots of the dedicated signal or channel; and receiving information from the first transceiver at the second transceiver, informing the second transceiver which future time slots are going to be used for the dedicated signal or channel.

2. The method of claim 1, wherein the second transceiver measures the signal strength of the dedicated signal or channel in each time slot where it is used by the first transceiver.

3. The method of claim 2, wherein the second transceiver transmits measurement reports to the first transceiver based on the measurement in each individual time slot where the dedicated signal or channel is used by the first transceiver.

4. The method of claim 1, wherein the first transceiver is a base station in a cellular wireless communications system and the second transceiver is a user terminal in said system.

5. The method of claim 1, wherein the wireless communication system comprises a Time Division Synchronous Code Multiple Access (TD-SCDMA) cellular system.

6. The method of claim 5, wherein the dedicated signal or channel is a HS-PDSCH channel in the TD-SCDMA cellular system.

7. The method of claim 1, wherein the second transceiver includes at least one suggested down link parameter in the report.

8. The method of claim 7, wherein said at least one parameter is a Recommended Transport Block Size (RTBS) or a Recommended Modulation Format (RMF).

9. The method of claim 1, wherein the first transceiver is a NodeB and the second transceiver is a certain User Equipment (UE), and wherein the NodeB sets for the UE at least one down link channel parameter, including at least one of a Transport Block Size or a Modulation Format, for one or more time slots according to the report from the UE.

10. A user terminal for use in a cellular wireless communications system that uses Time Division Duplex (TDD), wherein communication is divided into time frames comprising a number of time slots, wherein the user terminal is configured for communicating with a base station in the system, for detecting and measuring the signal strength of a certain predefined signal or channel transmitted by the base station in more than one TDD time slots of the system, and for reporting said measured signal strength to the base station, and wherein the user terminal comprises:

a receiver for receiving signals from the base station and a transmitter for transmitting signals to the base station;

detecting and measuring circuitry associated with the receiver and configured to detect and measure the signal strength of said signal or channel in more than one time slot of one and the same TDD frame; and processing circuitry associated with the receiver and transmitter and configured to report measurements of the signal strength in individual time slots to the base station, and to receive information from the base station, informing the user terminal which time slots in future TDD frames are going to be used by the base station for the signal or channel.

11. The user terminal of claim 10, wherein the user terminal is configured to measure the signal strength of said signal or channel in each time slot of a time frame where it is used by the base station.

12. The user terminal of claim 11, wherein the user terminal is configured to transmit measurement reports to the base station, based on the measurement in each individual time slot of one and the same TDD frame where the dedicated signal is used by the base station.

13. The user terminal of claim 10, wherein the user terminal is configured for use in a Time Division Synchronous Code Multiple Access (TD-SCDMA) cellular system.

14. The user terminal of claim 13, in which the signal or channel which the terminal can measure and report is a HS-PDSCH channel in the TD-SCDMA system.

15. The user terminal of claim 13, wherein the user terminal is configured to include at least one of a Recommended Transport Block Size (RTBS) or a Recommended Modulation Format (RMF) in the report it sends to the base station.

* * * * *

UNITED STATES PATENT AND TRADEMARK OFFICE
CERTIFICATE OF CORRECTION

| | |
|---|---|
| PATENT NO. | : 8,134,933 B2 |
| APPLICATION NO. | : 12/676059 |
| DATED | : March 13, 2012 |
| INVENTOR(S) | : Xiao et al. |

It is certified that error appears in the above-identified patent and that said Letters Patent is hereby corrected as shown below:

In Column 6, Line 38, in Claim 7, delete "report." and insert -- reports. --, therefor.

In Column 6, Line 47, in Claim 9, delete "report" and insert -- reports --, therefor.

Signed and Sealed this
Second Day of October, 2012

David J. Kappos
*Director of the United States Patent and Trademark Office*